Patented Nov. 22, 1938

2,137,350

UNITED STATES PATENT OFFICE 2,137,350

MANUFACTURE OF CARTRIDGE CASES

Horace Ainley Roberts, Huddersfield, England

No Drawing. Application August 28, 1936, Serial No. 98,421. In Great Britain September 19, 1935

9 Claims. (Cl. 102—16)

This invention relates to the manufacture of shot gun cartridge cases and in particular to cartridge cases which are moulded from thermoplastic materials.

It has been proposed to manufacture cartridge cases from mouldable material such as Celluloid, cellulose acetate compositions, synthetic resin, casein, and the like, but as far as I am aware commercially successful cartridge cases containing such compositions have not yet appeared on the market. While compositions of this kind can be satisfactorily moulded into articles such as trays, drinking cups and the like, where these articles are not called upon to withstand any serious strains in normal use, cartridge cases moulded from plastic materials are, on the other hand, required to withstand very severe internal pressures up to about half a ton per square inch at the moment of firing. This necessitates sufficient elasticity in the tubular portion to allow it to stretch to the chamber walls of the gun and afterwards at least partially return to its original size. This latter property is necessary to ensure satisfactory ejection after firing. The tube must also be sufficiently flexible or pliable to allow it to be turned over in the usual way to hold the contents of the case firmly in position when this method of retention is used. Moreover, the head portion of the cartridge case which is moulded integrally with the tube must have sufficient elasticity and resilience to allow it to compress to the gun chamber walls under the pressure of the powder gases. On the other hand, the head must be sufficiently rigid to hold the ignition system firm against the striker blow so that the necessary sensitiveness can be obtained.

I have found that highly satisfactory cartridge cases can be manufactured from thermoplastic materials containing a binding medium such as cellulose acetate or other cellulose derivative or mixed esters and ethers of cellulose, or vinyl and acrylic acid derivatives, provided that a sufficient quantity of suitable plasticizer or plasticizers such as tri-ethyl-citrate, triacetin, ethyl phthalate, di-amyl tartrate, tri-phenyl phosphate, or tri-cresyl phosphate is incorporated in the mixture, together with a suitable filler or fillers such as ground cereal, French chalk, carbon black, or the like.

The essence of my invention resides in the correct proportioning of the plasticizer and the binding medium and I have found that the ratio of the plasticizer content to the amount of binding medium, i. e. cellulose acetate or the like should be from 45 parts to 75 parts of plasticizer to 100 parts of binding medium, depending upon the elasticity, flexibility, resilience, toughness, and water resisting properties of each or any of the plasticizers used.

The amount of filler should preferably not exceed 75% of the binding medium. This ratio of plasticizer to binding medium is very important in the manufacture of shotgun cartridge cases and numerous experiments have shown that while it is possible to mould cartridge cases from plastic materials having proportions of plasticizer and binding medium outside the desired ratio such cases are unreliable in use since they are either too brittle and consequently break in the gun, or they are too soft for practical purposes.

In one example of carrying my invention into effect I mould shotgun cartridge cases from a plastic material having the following composition:— Cellulose acetate 100 parts, Triethyl-citrate 68 parts and finely ground wheat flour 75 parts. The acetate is dispersed in a solvent such as acetone and other ingredients added and mixed, the solvent being evaporated and the residue cut up or granulated.

In a further example of a suitable composition the following components may be used.

| | Parts |
|---|---|
| Cellulose acetate | 100 |
| Di-ethyl-phthalate | 72 |
| Finely ground wheat flour | 66 |

In a still further example of a suitable composition the following components may be substituted.

| | Parts |
|---|---|
| Cellulose acetate | 100 |
| Di-ethyl-phthalate | 60 |
| Tri-phenyl-phosphate | 12 |
| Finely ground wheat flour | 65 |

The cartridge case is moulded with the aid of pressure and heat, the procedure being very similar to that employed for products moulded from cellulose derivatives. The granulated moulding material is placed within a steam heated cylindrical mould, the lower part of which is shaped to form the rim of the cartridge case. A concentric cylindrical plunger having a slight taper is introduced under hydraulic pressure into the mould and causes the material to flow into the required shape. In the lower part of the mould is formed a cavity which is adapted to accommodate the ignition primer.

The mould is preferably cooled after the steam heating has been turned off so that the case can be quickly removed from the mould. After trimming the edge of the case the primer consisting of a cap chamber, cap and anvil is inserted, the cap and anvil being assembled in the cap chamber and the combination being then pressed into the cavity previously referred to.

Where it is essential that the cartridge cases shall be completely water resisting, non-hygroscopic fillers, such for example, as French chalk, lamp black or carbon black may be used in place of or together with finely ground wheat flour, or other cereals.

As an example the following components may be used.

|  | Parts |
|---|---|
| Cellulose acetate | 100 |
| Di-ethyl-phthalate | 60 |
| Tri-phenyl-phosphate | 12 |
| French chalk | 70 |

It will be noticed that in this example both the filler and the plasticizing agents are substantially water resisting and I have found that cartridge cases produced from this composition are for all practical purposes as water-resisting as metal cartridge cases.

Where a substantially white or uncoloured filler is used, such as a cereal filler or French chalk, various pigments may be used or incorporated in the composition to produce different coloured cartridge cases such as are required by the trade.

As many apparently widely different embodiments of this invention may be made without departing from the spirit and scope thereof, it is to be understood that I do not limit myself to the specific embodiments thereof except as defined in the appended claims.

I claim:—

1. As an article of manufacture, a shot gun cartridge case moulded from thermoplastic materials comprising a binding medium, a plasticizer and a filler, in which the ratio of the plasticizer content to the amount of binding medium varies from 45 parts to 75 parts of plasticizer to 100 parts of binding medium, the amount of filler not exceeding 75% of the binding medium.

2. An article of manufacture as set out in claim 1 in which the binding medium is selected from the group consisting of cellulose derivatives, vinyl and acrylic acid derivatives, and in which the plasticizer is selected from the group consisting of triethyl-citrate, triacetin, ethyl phthalate, diamyl tartrate, triphenyl phosphate and tricresyl phosphate.

3. An article of manufacture as set out in claim 1 in which the binding medium is a cellulose derivative, and in which the plasticizer is selected from the group consisting of triethyl-citrate, triacetin, ethyl phthalate, diamyl tartrate, triphenyl phosphate and tricresyl phosphate.

4. An article of manufacture as set out in claim 1 in which the binding medium is cellulose acetate and the plasticizer is ethyl phthalate.

5. An article of manufacture as set out in claim 1 in which the binding medium is cellulose acetate, the plasticizer is ethyl phthalate, and the filler is finely ground wheat flour.

6. An article of manufacture as set out in claim 1 in which the filler consists of a finely ground cereal.

7. An article of manufacture as set out in claim 1 in which the filler consists of a non-hygroscopic material.

8. An article of manufacture as set out in claim 1 in which both the filler and the plasticizer are substantially water-resisting.

9. An article of manufacture as set out in claim 1 in which a cavity is formed in the base portion of said cartridge case, and an ignition primer is frictionally held in position in said cavity.

HORACE AINLEY ROBERTS.